(12) United States Patent
Baker et al.

(10) Patent No.: US 10,089,902 B2
(45) Date of Patent: Oct. 2, 2018

(54) RESETTABLE LOCKING SHIELD-ACTIVATED AUTO INJECTOR TRAINING DEVICE

(71) Applicants: Jeff Baker, Orlando, FL (US); Wai Yin Christopher Chung, Orlando, FL (US); Hou Shi Shuang, Ningbo (CN); Francis Michael Siemer, Orlando, FL (US); Tingting Liu, Orlando, FL (US)

(72) Inventors: Jeff Baker, Orlando, FL (US); Wai Yin Christopher Chung, Orlando, FL (US); Hou Shi Shuang, Ningbo (CN); Francis Michael Siemer, Orlando, FL (US); Tingting Liu, Orlando, FL (US)

(73) Assignee: NOBLE INTERNATIONAL, INC., Orlando, FL (US)

( * ) Notice: Subject to any disclaimer, the term of this patent is extended or adjusted under 35 U.S.C. 154(b) by 306 days.

(21) Appl. No.: 15/161,934

(22) Filed: May 23, 2016

(65) Prior Publication Data

US 2017/0337844 A1 Nov. 23, 2017

(51) Int. Cl.
*G09B 23/28* (2006.01)
*G09B 19/24* (2006.01)

(52) U.S. Cl.
CPC ........... *G09B 23/285* (2013.01); *G09B 19/24* (2013.01)

(58) Field of Classification Search
USPC ........ 434/262, 267, 268, 272; 604/134, 135, 604/192–196
See application file for complete search history.

(56) References Cited

U.S. PATENT DOCUMENTS

| | | | | |
|---|---|---|---|---|
| 3,795,061 A | * | 3/1974 | Sarnoff | G09B 23/285 434/262 |
| 5,037,306 A | * | 8/1991 | van Schoonhoven | G09B 23/285 434/262 |

(Continued)

*Primary Examiner* — Kurt Fernstrom
(74) *Attorney, Agent, or Firm* — Timothy H. Van Dyke; Beusse, Wolter, Sanks & Maire PLLC

(57) ABSTRACT

In one embodiment, a resettable injection training device is provided herein. The injection training device includes an outer shell comprising a proximal end and a distal end, the outer shell defining a chamber there within, and a plunger slidable within the chamber, the plunger comprising a plunger feature and one or more rail portions. The injection training device further includes a locking safety shield disposed and slidable within the chamber, the safety shield comprising a proximal end and a distal end, the distal end for interfacing with a target surface to actuate the injection training device, the safety shield comprising an extended locked position, an extended unlocked position, and a retracted position. The injection training device further includes a rotatable plunger collar comprising a plunger collar tab for interfacing with the plunger feature and with the safety shield, wherein the plunger collar is rotated in a first direction to release the plunger from a pre-fired position to a fired position, a rotatable safety shield collar comprising a locking tab, the locking tab for interfacing with the safety shield to lock the safety shield in an extended, locked position in the fired position, and a reset component disposed within the chamber, said reset component configured to interface with the safety shield collar to unlock the safety shield during reset of the device.

14 Claims, 17 Drawing Sheets

(56) References Cited

U.S. PATENT DOCUMENTS

| | | | | |
|---|---|---|---|---|
| 5,071,353 | A * | 12/1991 | van der Wal | A61M 5/2033 434/262 |
| 5,567,160 | A * | 10/1996 | Massino | G09B 23/285 434/262 |
| 6,162,197 | A * | 12/2000 | Mohammad | A61B 5/15003 604/195 |
| 6,238,407 | B1 * | 5/2001 | Wolf | A61B 17/3496 606/185 |
| 7,682,155 | B2 * | 3/2010 | Raven | G09B 23/285 434/262 |
| 8,556,634 | B2 * | 10/2013 | Mourton | G09B 23/28 434/272 |
| 8,932,252 | B2 * | 1/2015 | Edwards | G06Q 10/00 434/262 |
| 9,443,445 | B2 * | 9/2016 | Laurusonis | G09B 23/285 |
| 9,911,364 | B2 * | 3/2018 | Baker | G09B 23/285 |
| 2014/0288529 | A1 * | 9/2014 | Baker | A61M 5/31566 604/506 |
| 2015/0100024 | A1 * | 4/2015 | Baker | G09B 23/285 604/157 |
| 2015/0235571 | A1 * | 8/2015 | Alexandersson | G09B 23/285 434/262 |
| 2016/0049098 | A1 * | 2/2016 | Swanson | G09B 23/285 434/262 |

* cited by examiner

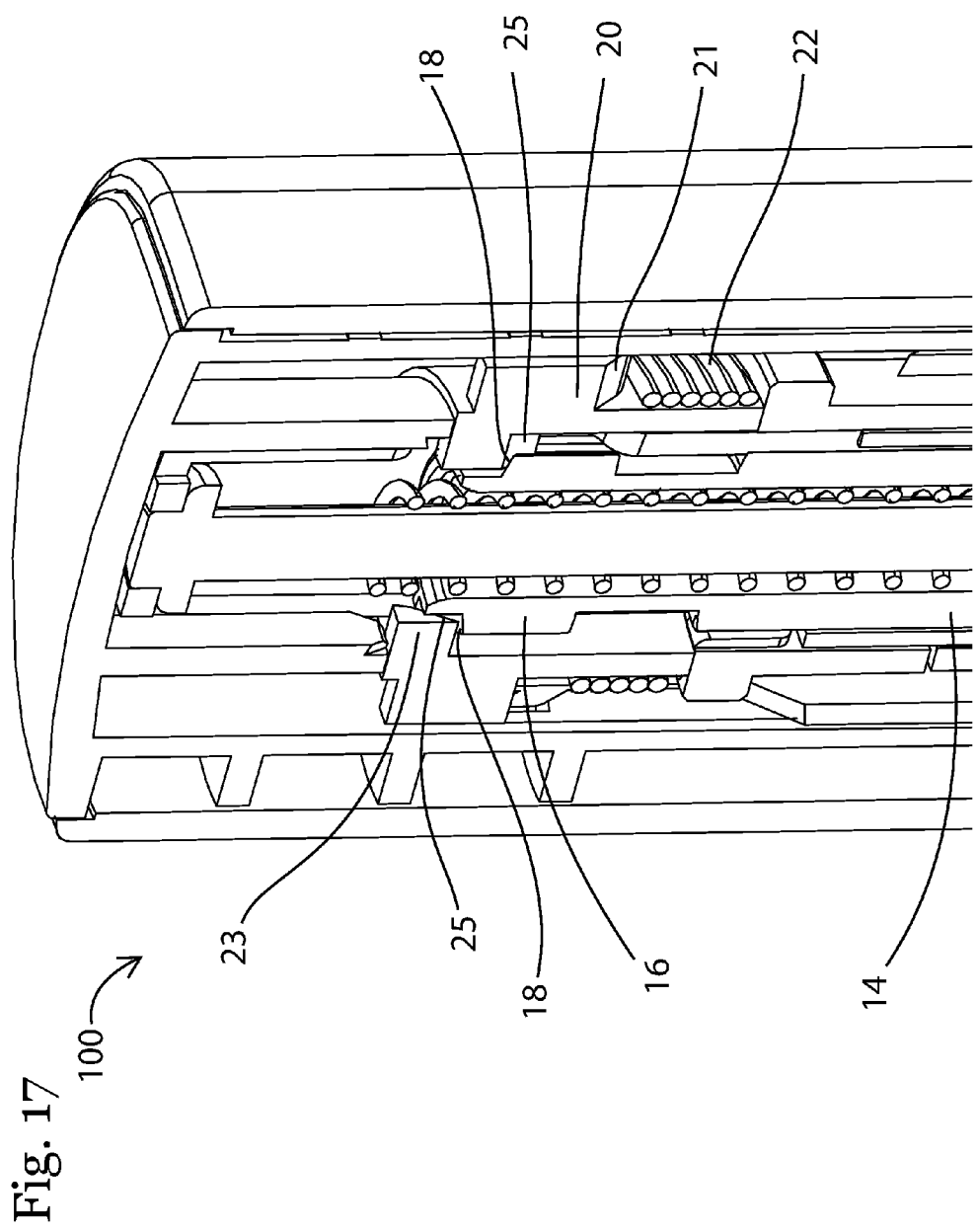

RESETTABLE LOCKING SHIELD-ACTIVATED AUTO INJECTOR TRAINING DEVICE

BACKGROUND

Injection devices have recently become increasingly popular for single dose or multi-dose, at home self-administration. These devices include both auto-injection devices and pre-filled syringe devices, and are often designed to accomplish two basic objectives: convenience of drug delivery in an outpatient or at home setting, and/or automation of drug delivery in an outpatient or at-home setting.

Injectable medications are required for a number of varying illnesses and diseases. A number of injectable medications require self-injection by a patient. Self-injection of a medicament using a device having a needle carries with it a certain stigma. Oftentimes patients are weary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. Safe use and re-use of these training devices requires a resettable device. Therefore, a device which allows repeated practice and ease of use to enhance familiarity with the injection device and the self-injection process, along with the ability to safely and efficiently reset the device is paramount to an effective device for injection training.

SUMMARY

In one embodiment, a resettable injection training device is provided herein. The injection training device includes an outer shell comprising a proximal end and a distal end, the outer shell defining a chamber there within, and a plunger slidable within the chamber, the plunger comprising a plunger feature and one or more rail portions. The injection training device further includes a locking safety shield disposed and slidable within the chamber, the safety shield comprising a proximal end and a distal end, the distal end for interfacing with a target surface to actuate the injection training device, the safety shield comprising an extended locked position, an extended unlocked position, and a retracted position. The injection training device further includes a rotatable plunger collar comprising a plunger collar tab for interfacing with the plunger feature and with the safety shield, wherein the plunger collar is rotated in a first direction to release the plunger from a pre-fired position to a fired position, a rotatable safety shield collar comprising a locking tab, the locking tab for interfacing with the safety shield to lock the safety shield in an extended, locked position in the fired position, and a reset component disposed within the chamber, said reset component configured to interface with the safety shield collar to unlock the safety shield during reset of the device.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 17 is a cross-sectional view of a distal end of the components of an embodiment of the device.

DETAILED DESCRIPTION

Figure 1:
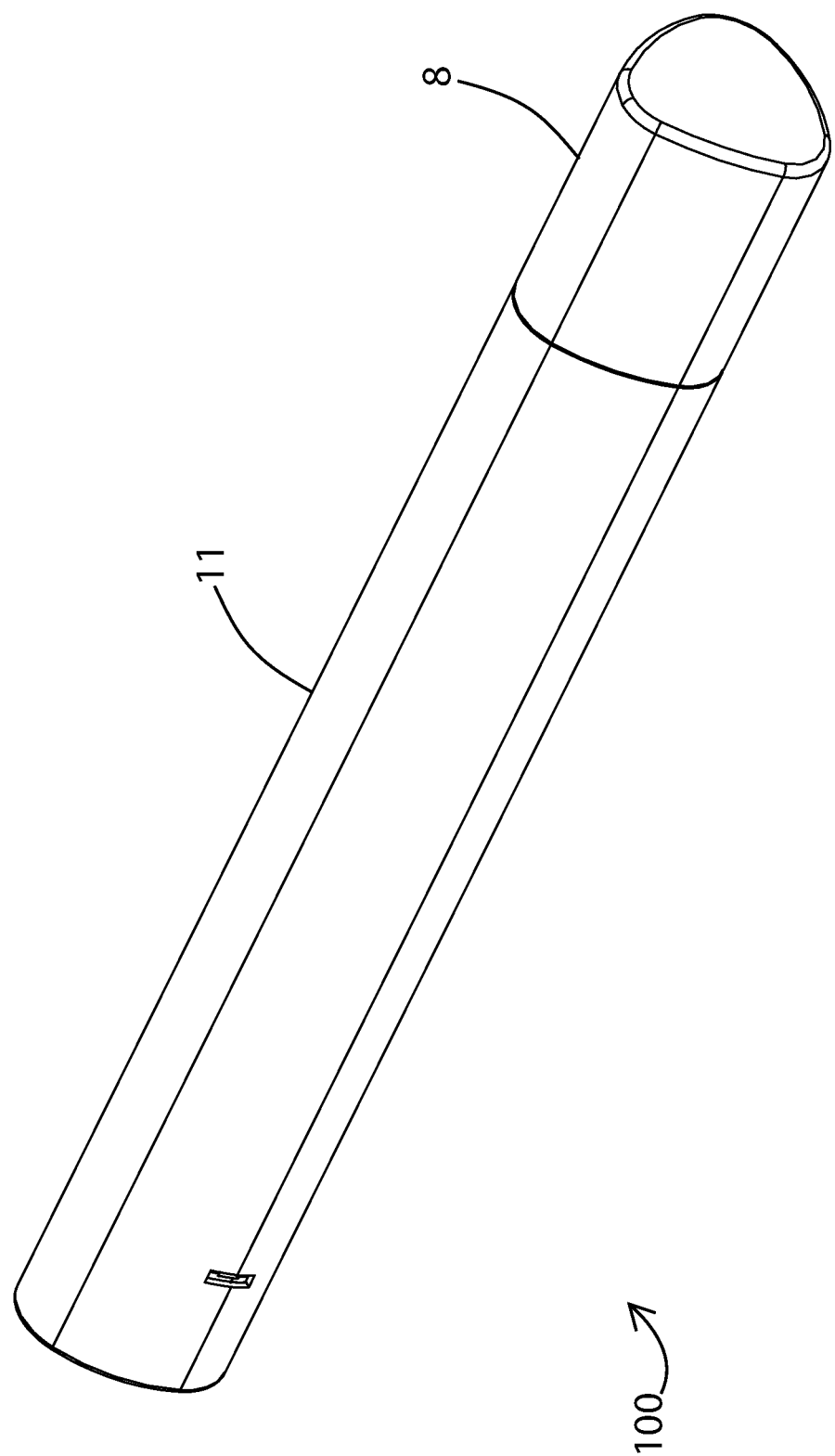
FIG. 1 includes a perspective view of an embodiment of the device.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another. The modifier "about" used in connection with a quantity is inclusive of the stated value and has the meaning dictated by the context. It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. As another non-limiting example, a range of "between 20 and 10" can also include the values 20, 10.

The term "adjacent" as used herein, includes but is not limited to near, associated with, or in close proximity to.

FIG. 1 includes a perspective view of an embodiment of a resettable injection training device 100. The resettable injection training device 100 includes an outer shell 11 having a proximal end 11a and a distal end 11b, the outer shell defining a chamber 11c there within. A plunger 14 (not seen in FIG. 1) is slidable within the chamber 11c. A locking safety shield 12 is disposed and slidable within the chamber 11c, the safety shield 12 including a proximal end 12a and a distal end 12b, the distal end 12b for interfacing with a target surface to actuate the injection training device 100. The safety shield 12 includes an extended locked position, an extended unlocked position, and a retracted position. When the safety shield 12 is in an extended unlocked position, the distal end 12b may be pressed against a target surface to actuate the device 100. Upon application of a force against the distal end 12b of the safety shield 12, the device 100 is actuated (i.e., fired). Actuation steps are shown in FIGS. 9-13 described in detail below.

Figure 2:
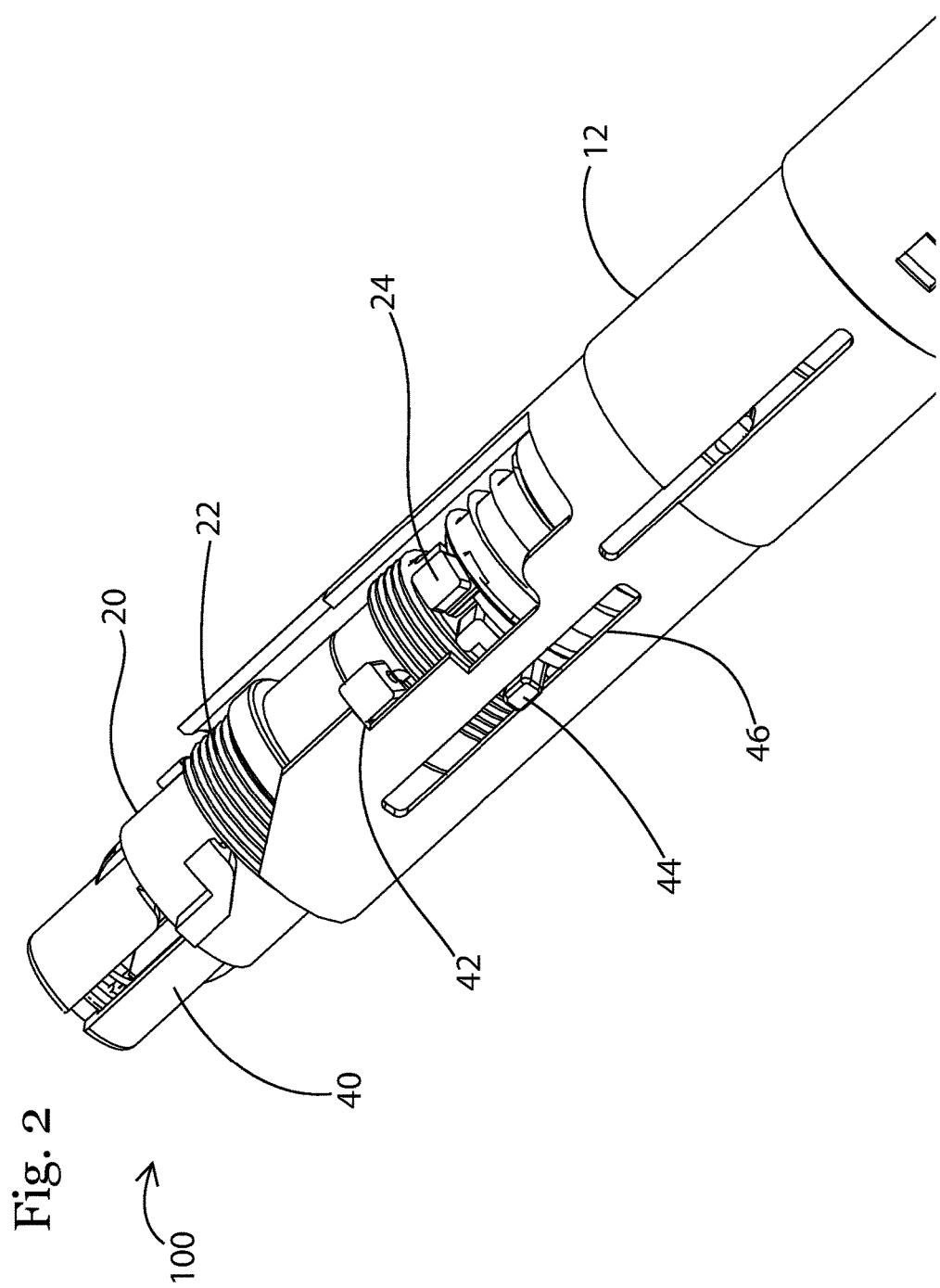
FIG. 2 includes a perspective view of a proximal end of an embodiment of the device.

FIG. 2 includes a perspective view of a proximal end of an embodiment of the device 100 in a "ready to fire" position. The outer shell 11 is not shown. The proximal end 12b of the safety shield is shown, along with the safety shield limiting tab 42 which prevents the safety shield from disengaging from the device 100. The plunger 14 is surrounded by the plunger mechanism housing 40. The safety shield 12 may include a safety shield guide slot 46, as shown, wherein a safety shield guide tab 44 is movable within the safety shield guide slot 46 to maintain alignment of the safety shield 12 as it moves relative to the device 100. A safety shield locking tab 24 is provided in an unlocked position, such that the safety shield 12 is free to move relative to the device 100. A rotatable plunger collar 20 is provided at the proximal end of the device 100, and associated therewith, a plunger collar torsion spring 22, is shown in FIG. 2.

Figure 3:
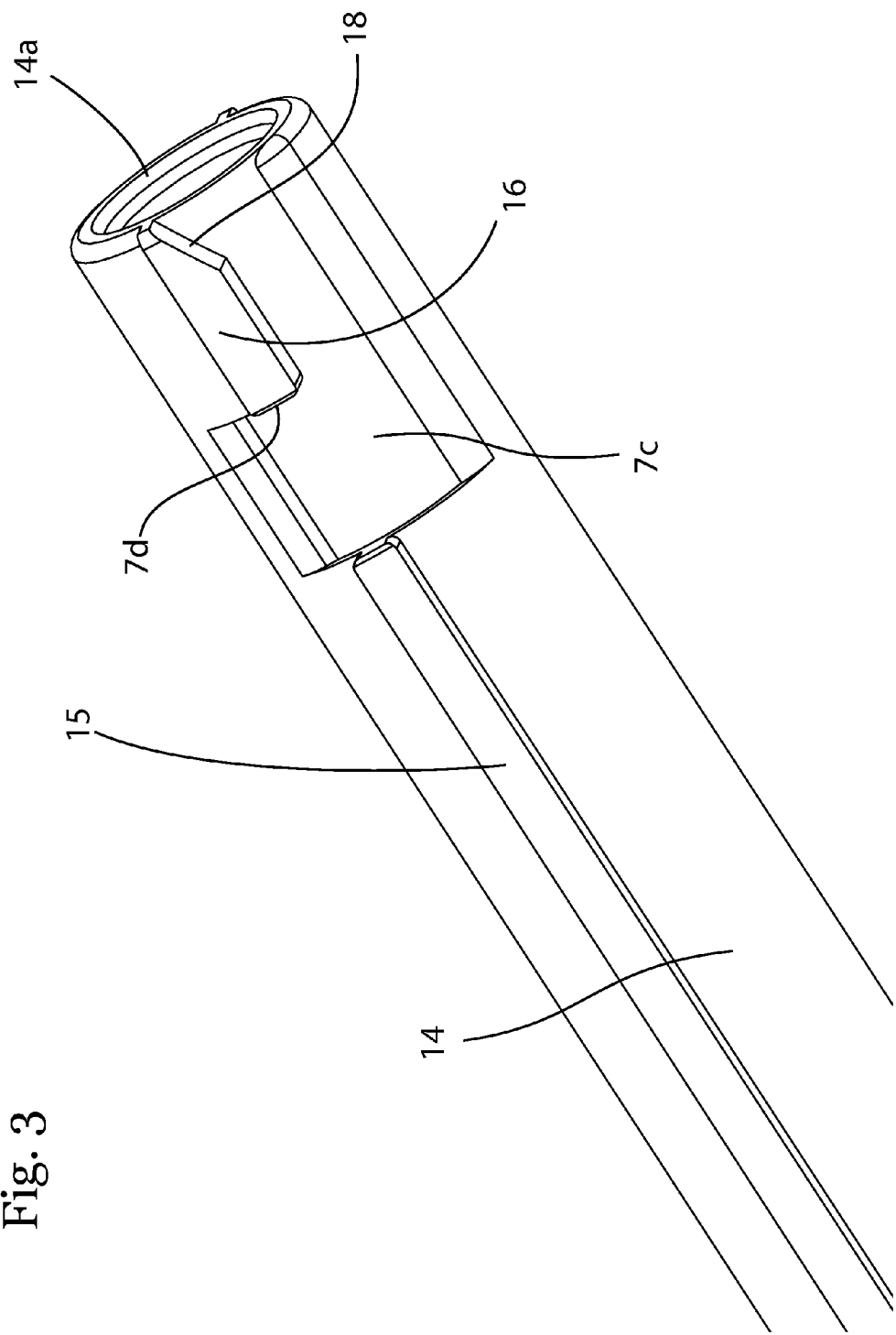
FIG. 3 is a perspective view of a proximal end of an embodiment of a plunger.

A view of the proximal end of the plunger 14 can be seen in the perspective view of FIG. 3. The plunger includes a proximal end 14a and a distal end 14b (not shown in FIG. 3). The plunger 14 further includes one or more plunger rail component(s) 15 along its shaft. Near the proximal end 14b of the plunger, a plunger feature 16 is provided having a plunger locking tab 7d thereon, and a safety shield locking gap 7c is also shown in FIG. 3. A plunger angled ramp portion 18 is provided on a portion of the plunger feature 16, and its function will be further described in more detail herein.

Figure 4:
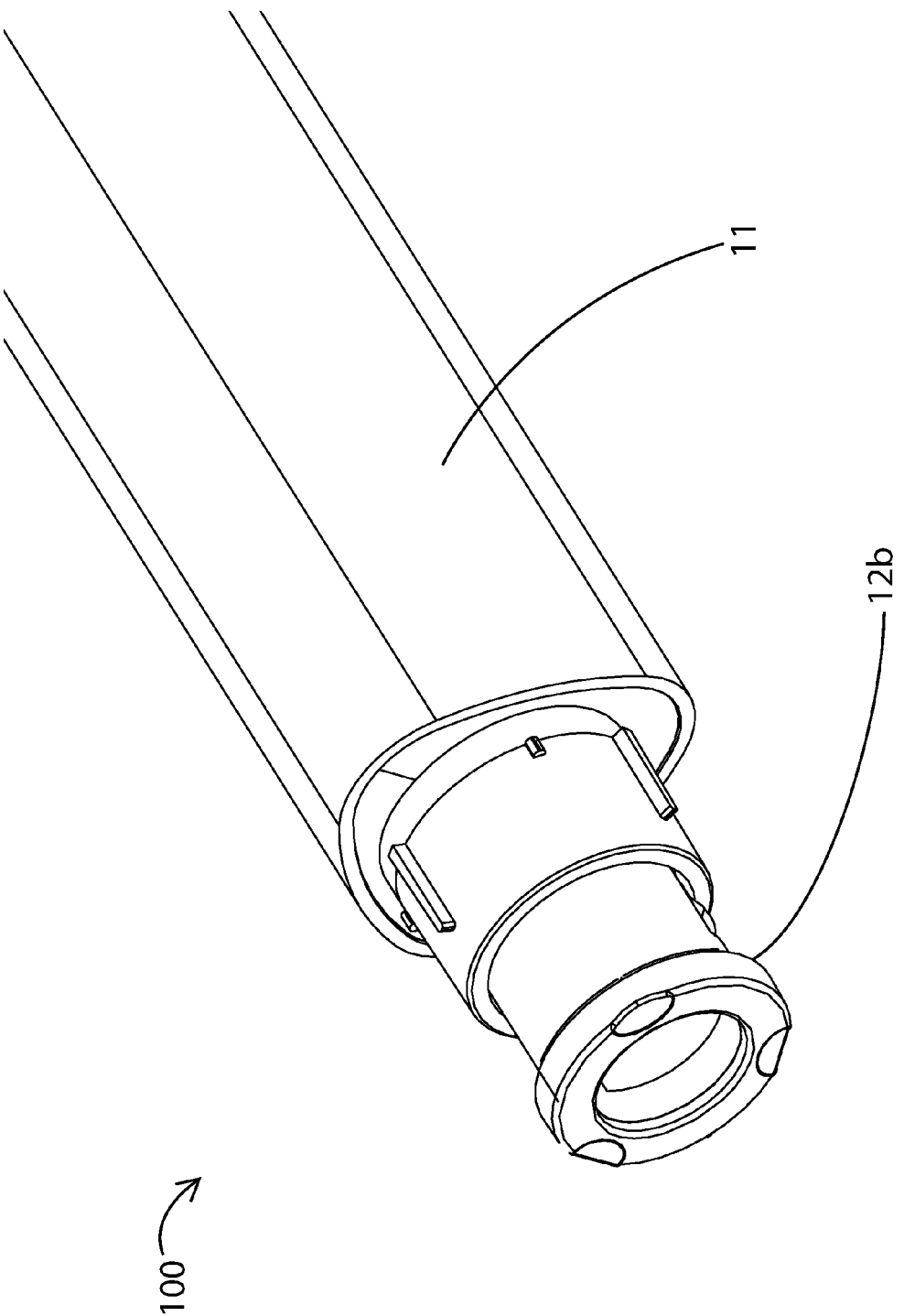
FIG. 4 is a perspective distal end view of an embodiment of a shield and outer shell of the device, the shield is in an unlocked, ready to fire position.

FIG. 4 is a perspective distal end view of an embodiment of a shield 12b and outer shell 11 of the device 100, the shield 12 is in an unlocked, ready to fire position in FIG. 4. Upon application of a force to the distal end of the shield 12b to move it toward the proximal end of the device 100, the device 100 may be activated, i.e. fired.

Figure 5:
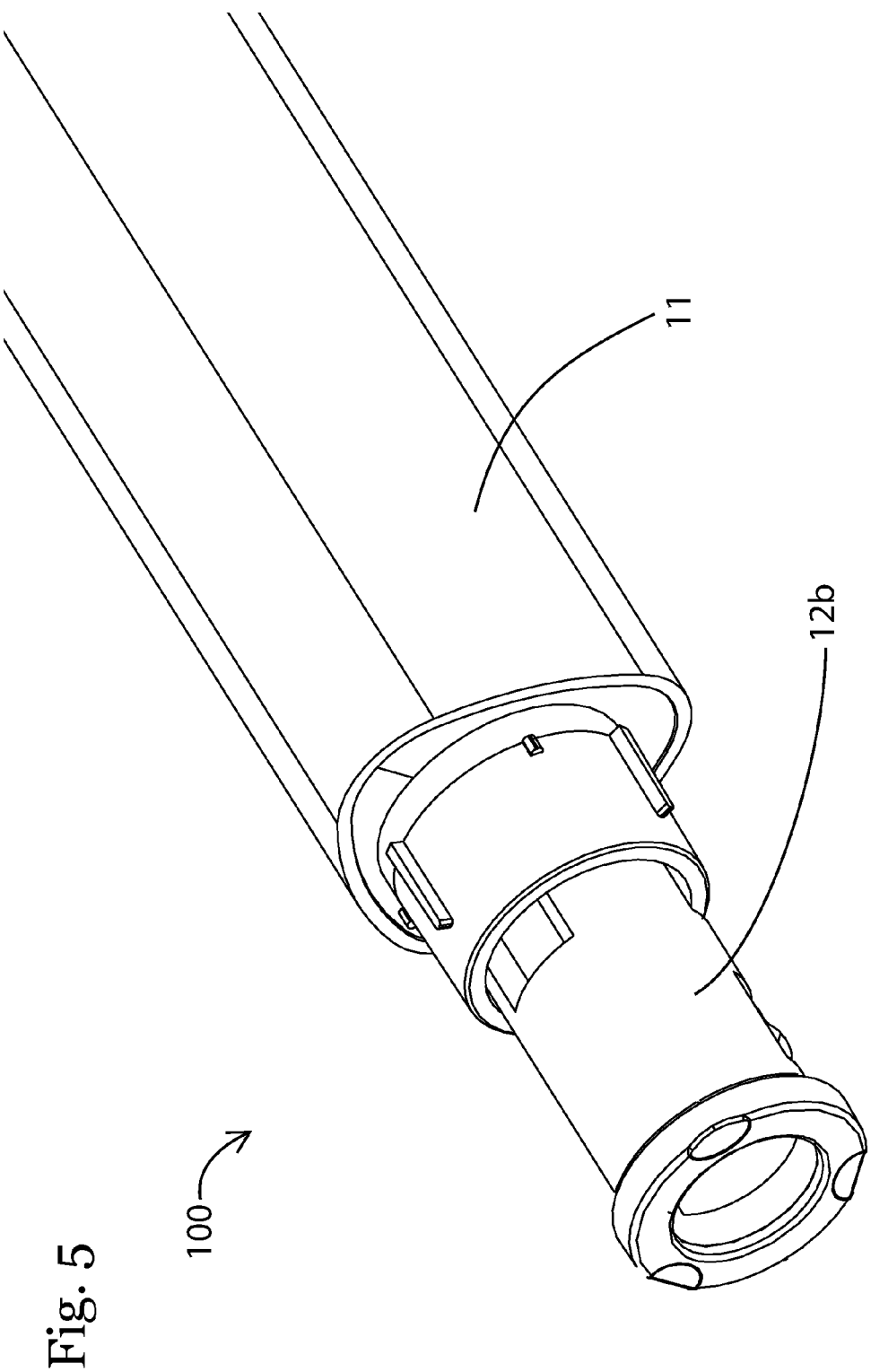
FIG. 5 is a perspective distal end view of an embodiment of the shield and outer shell of the device, wherein the shield is in an extended, locked, post-fired position.

FIG. 5 is a perspective distal end view of an embodiment of the shield 12 and outer shell 11 of the device 100, wherein the shield 12 is in an extended, locked, post-fired position. As can be seen in the Figure, the distal end of the shield 12b may extend further from the outer shell 11 in one, non-limiting embodiment, when the safety shield 12 is in a post-fired and locked position.

Figure 6:
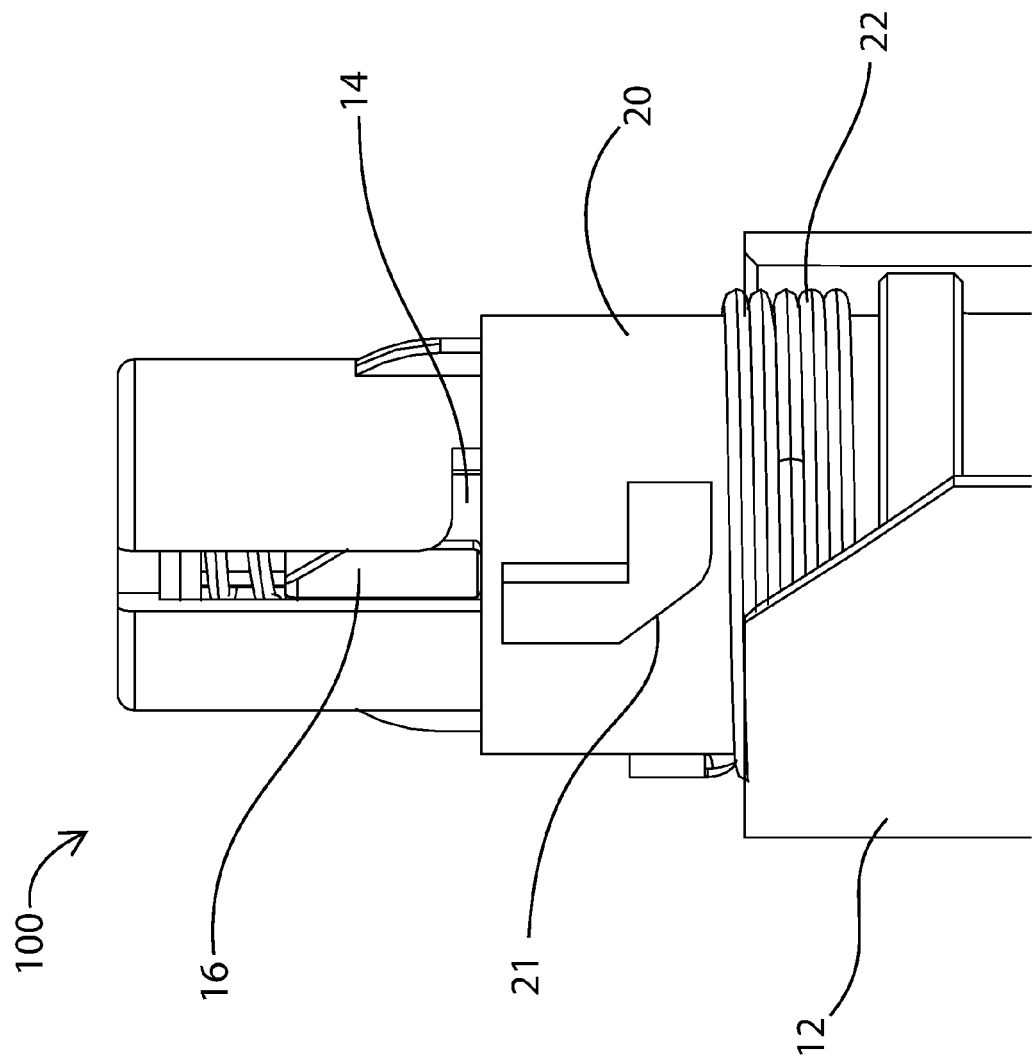
FIG. 6 is a side view of a proximal end of an embodiment of the device.

FIG. 6 is a side view of a proximal end of an embodiment of the device 100. FIG. 6 shows the plunger feature 16 of the plunger 14 in association with a feature on the plunger collar 20. The plunger collar 20 includes a plunger collar interfacing surface 21 on its outer surface. The plunger collar interfacing surface 21 may interact with a portion of the shield 12 in one, non-limiting embodiment. The plunger collar torsion spring 22 is used to rotate the plunger collar 20 relative to the device 100 as will be described in more detail below.

Figure 7:
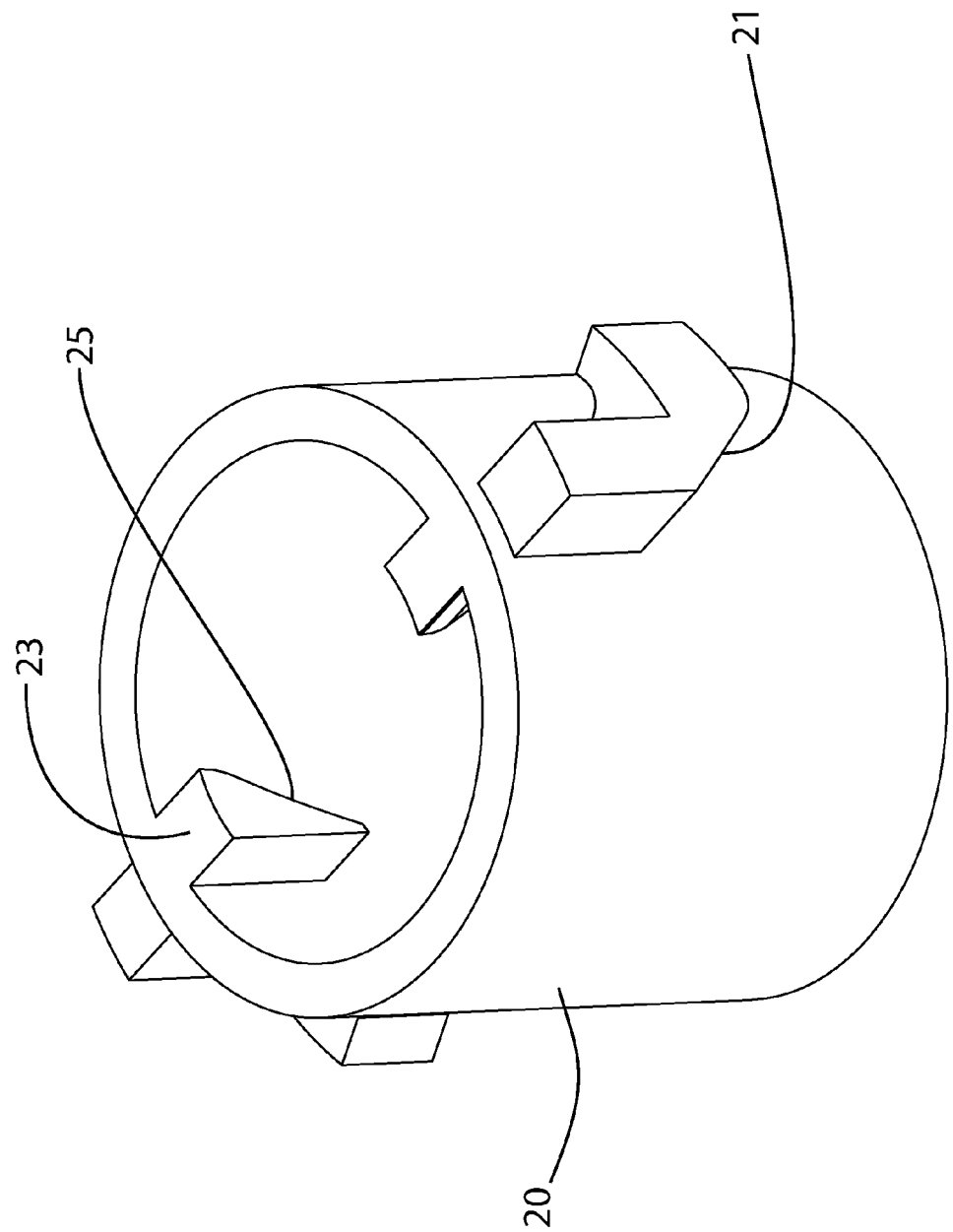
FIG. 7 is a top perspective view of an embodiment of a rotatable plunger collar.

FIG. 7 is a top perspective view of an embodiment of the rotatable plunger collar 20. The plunger collar 20 includes the plunger collar interfacing surface 21 on the outer portion thereof, and a plunger collar tab 23 on an inner portion, or inner surface, thereof, having a plunger collar angled ramp portion 25 as seen in FIG. 7.

Figure 8:
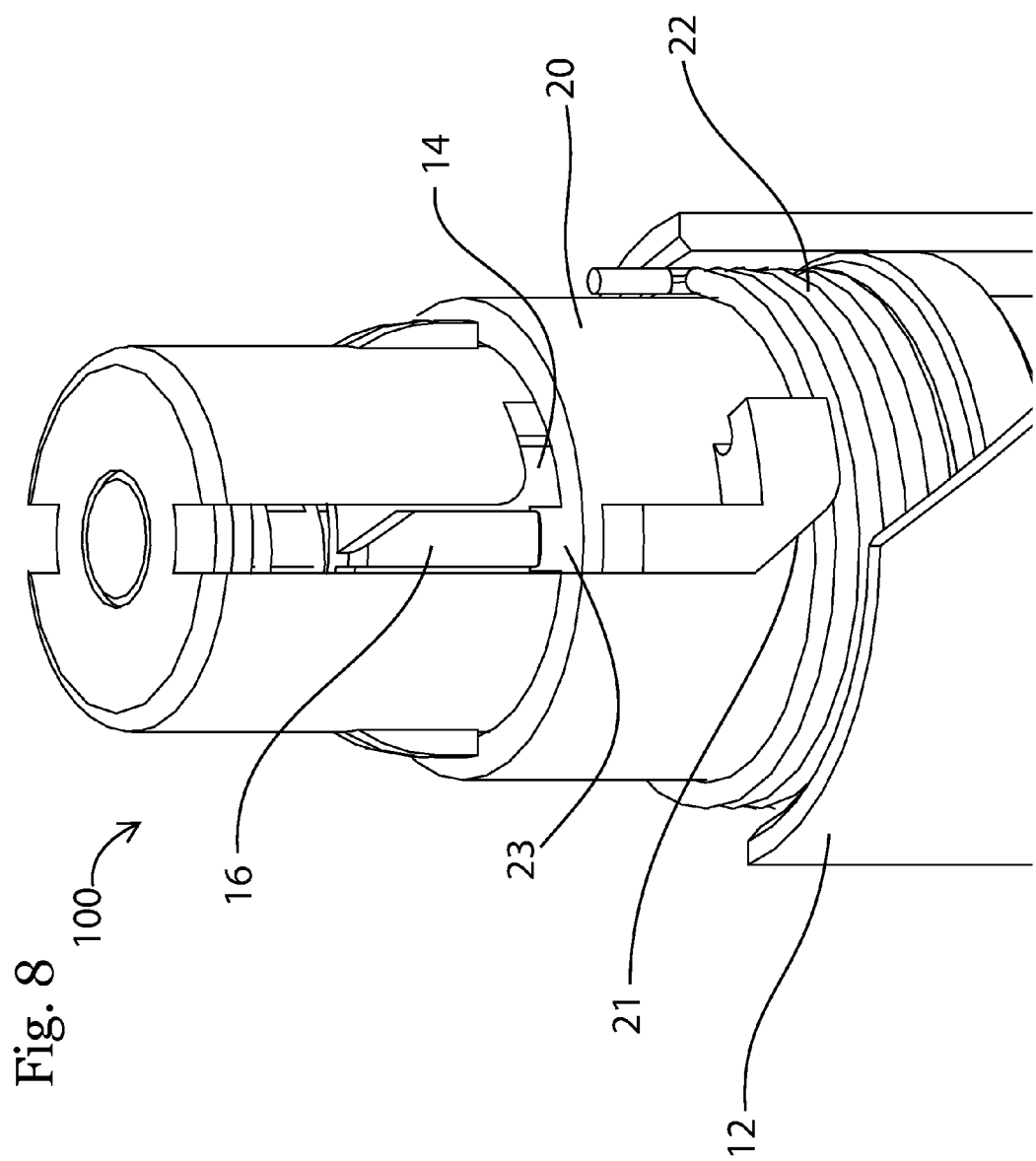
FIG. 8 is a perspective top view of the proximal end of the embodiment of the device.

FIG. 8 is a perspective top view of the proximal end of an embodiment of the device 100, wherein the plunger feature 16 of the plunger 14 is shown as interfacing with the plunger collar tab 23. The safety shield 12 is provided; however, the shield 12 has not been fully retracted to initiate firing of the device, as the shield 12 is not in contact with the plunger collar interfacing surface 21 as shown in FIG. 8. The plunger collar torsion spring 22 is also shown in FIG. 8.

Figure 9:
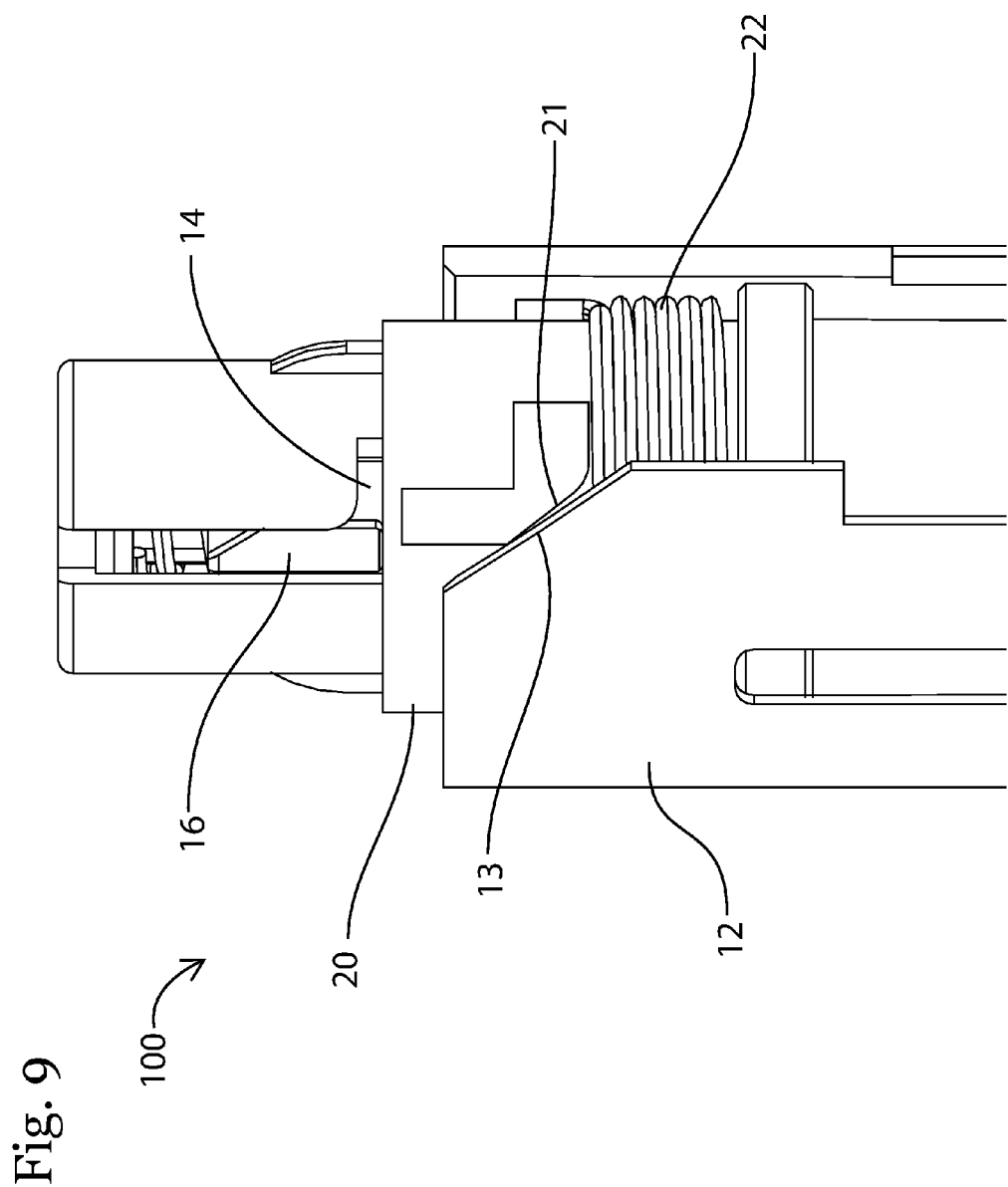
FIG. 9 is a side view of a proximal end of an embodiment of the device, wherein the shield is moved toward the proximal end of the device during use of the device.
Figure 10:
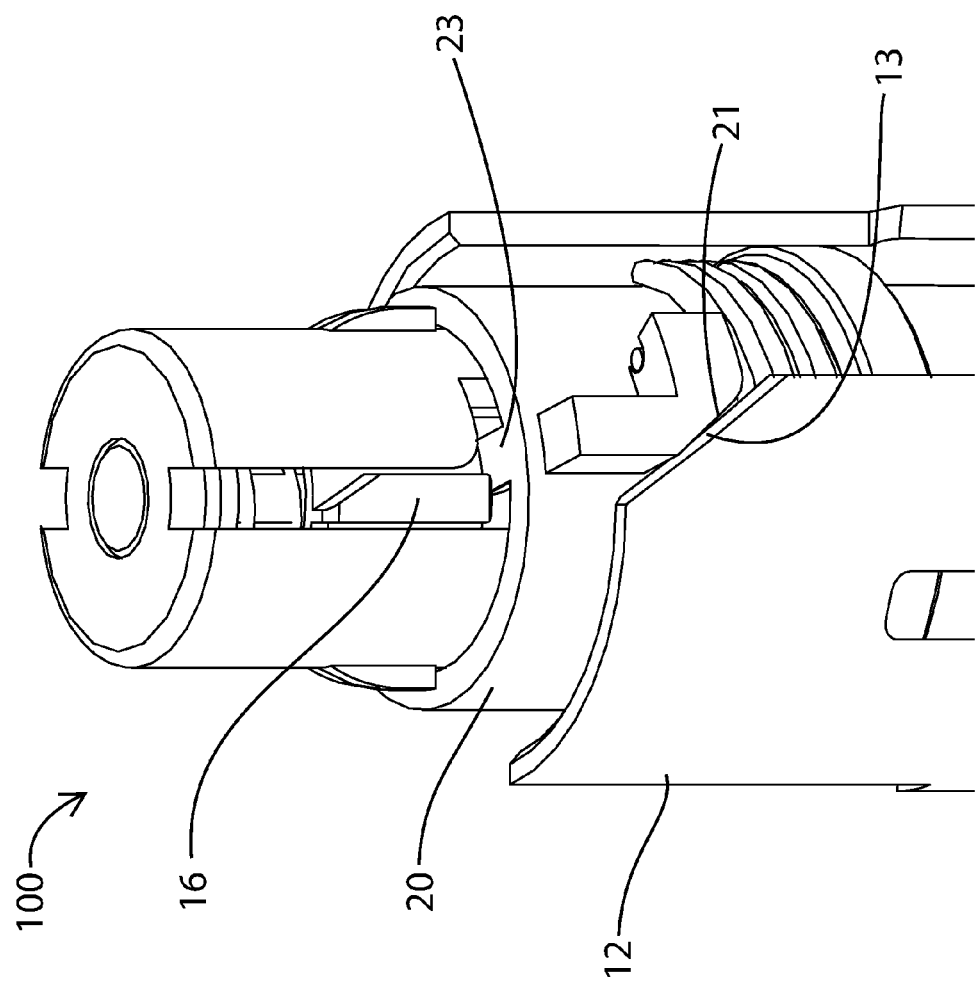
FIG. 10 is a top perspective view of an embodiment of the device, wherein an interaction between the shield and the rotatable plunger collar is shown.

FIGS. 9-10 provide side and top perspective view of a proximal end of an embodiment of the device, wherein the shield 12 is moved toward the proximal end of the device 100 during use of the device 100 in a first step in firing the device 100. A safety shield interfacing surface 13 interfaces with the plunger collar interfacing surface 21 as shown in FIGS. 9-10, causing the plunger collar 20 to rotate in a counter clockwise direction (if viewed from the proximal end of the device looking down), against the force of the plunger collar torsion spring 22, causing the displacement of the plunger feature 16 of the plunger 14 from the plunger collar tab 23 (shown in FIG. 10). The plunger collar tab 23 interfaces with the plunger feature 16 (assisted by the biased plunger collar torsion spring 22) to maintain the plunger in a pre-fired position until actuation of the device 100 via the safety shield 12 as shown in FIG. 9-10. As the safety shield 12 continues to move toward the proximal end of the device 100, the rotatable plunger collar 20 rotates against the force of the biased plunger collar torsion spring 22. Once the plunger collar 20 is rotated by interaction of the safety shield interfacing surface 13 and the plunger collar interfacing surface 21, the plunger 14 is released and allowed to slide within the chamber 11c of the outer shell 11 toward the distal end of the device 100 as shown in FIG. 11.

Figure 11:
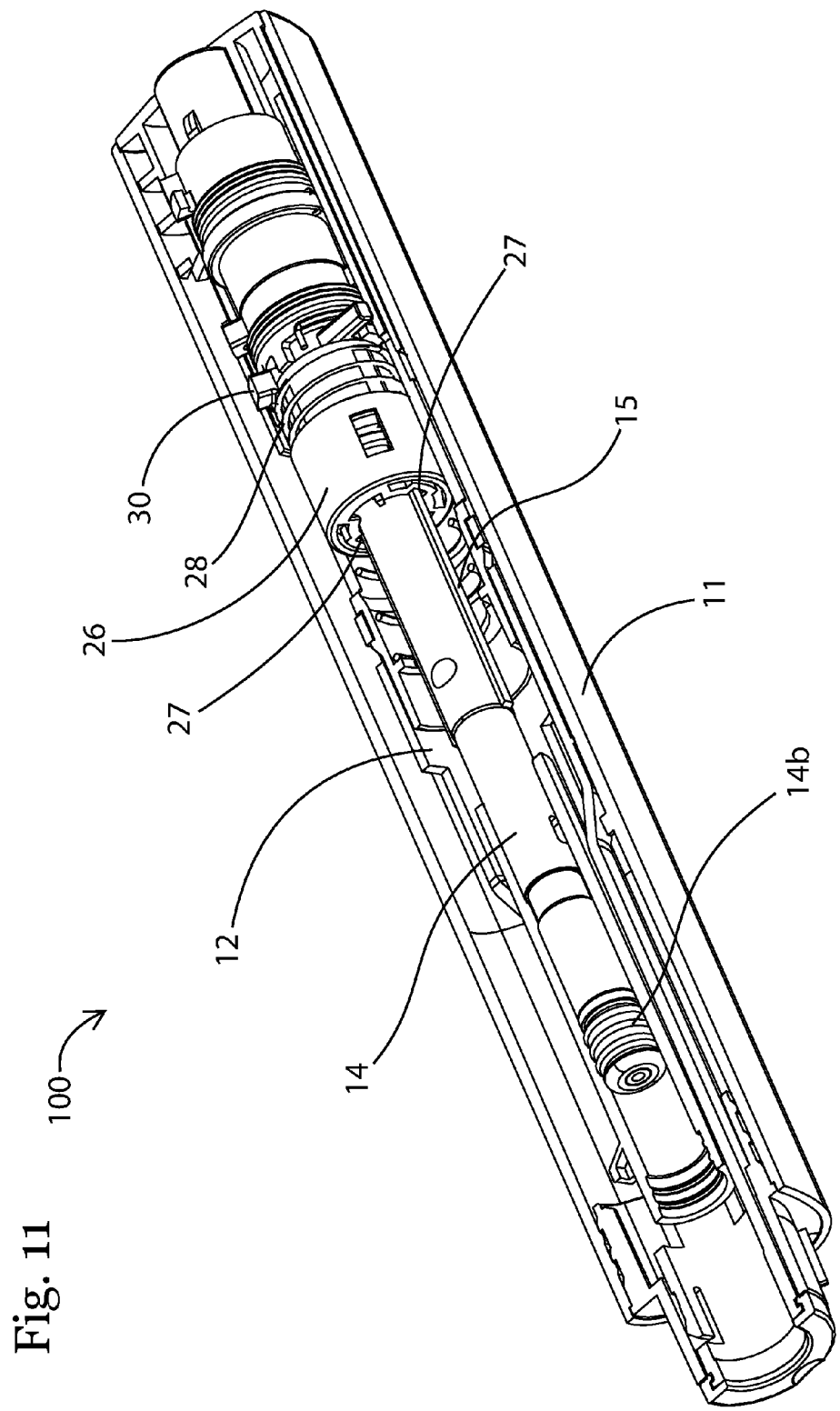
FIG. 11 is a partial cutaway view of a portion of an embodiment of the device, showing a plunger within a chamber of the device.
Figure 12:
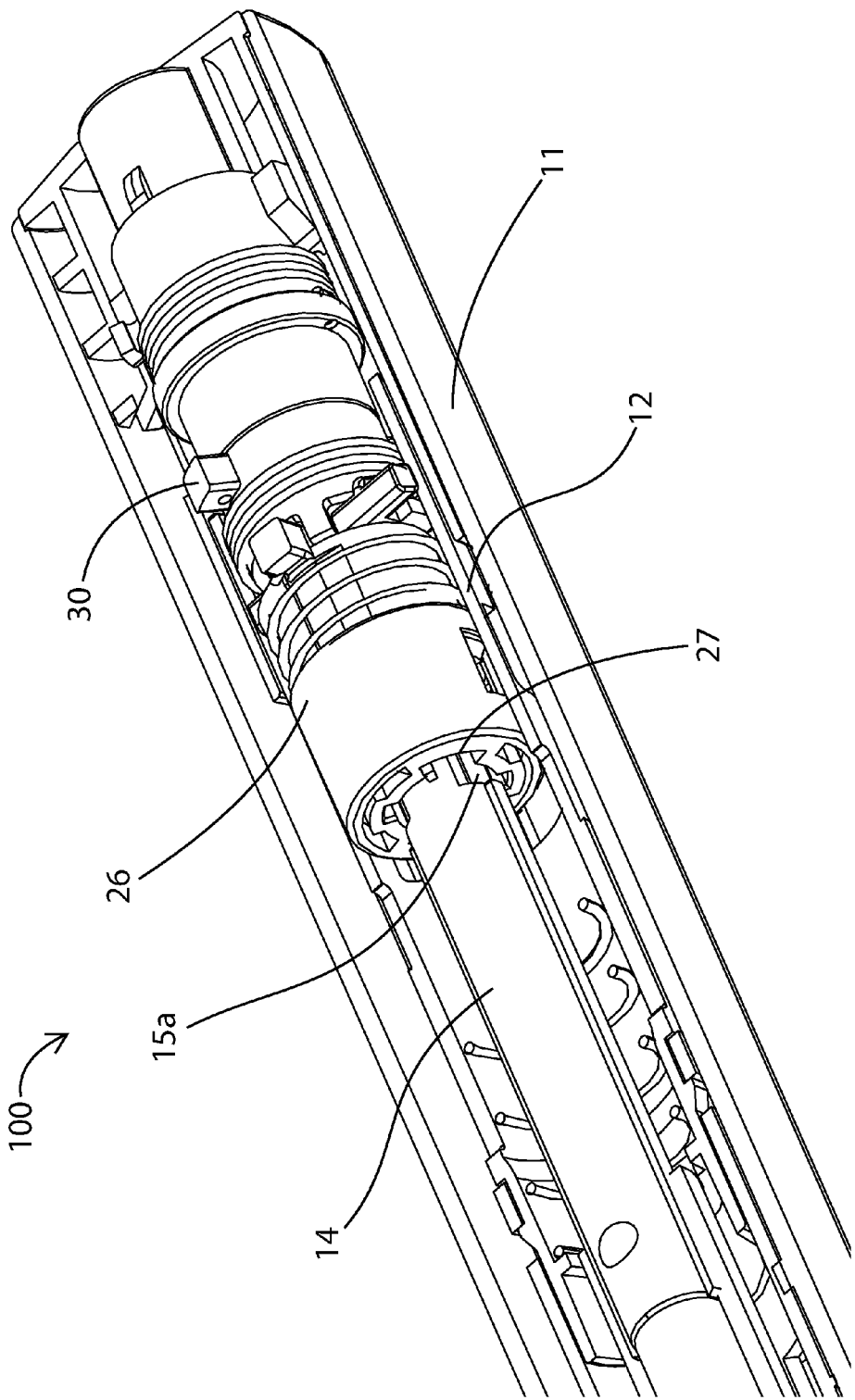
FIG. 12 is a partial cutaway view of a portion of an embodiment of the device, wherein the plunger is moved toward the distal end of the device.
Figure 13:
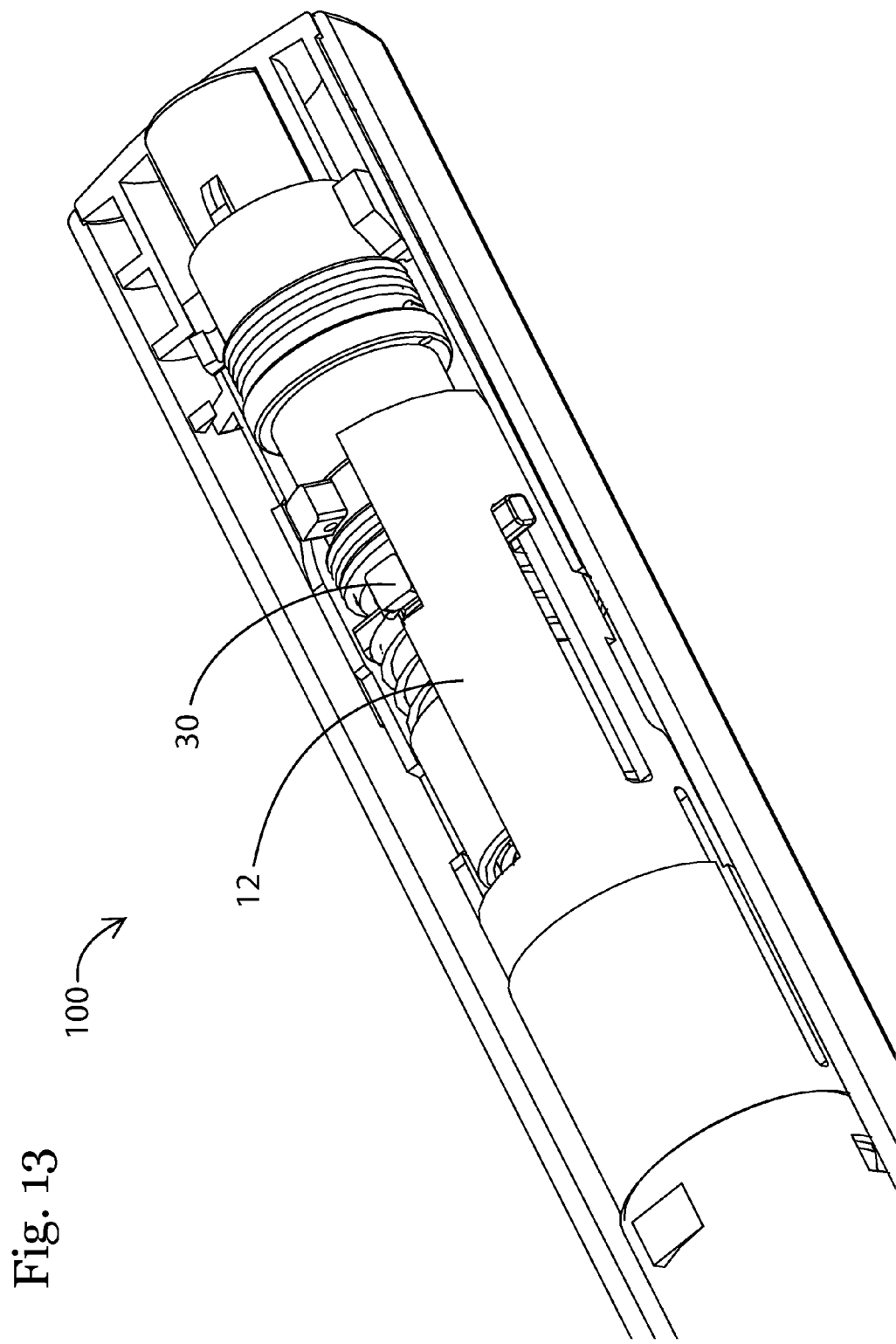
FIG. 13 is a partial cutaway view of a portion of the device wherein the safety shield moves into an extended, locked position, and a locking tab abuts the safety shield.

FIG. 11 is a partial cutaway view of a portion of an embodiment of the device 100, showing the distal end of the plunger 14b within the chamber 11c of the outer housing 11, following release of the plunger 14 from the pre-fired position. The plunger rail component(s) 15 are each slidable within a notch 27 on an inner surface of a safety shield collar 26 shown in FIG. 11. The safety shield collar 26 is associated with a safety shield torsion spring 28, and is rotatable relative to the outer housing 11. The locking tab 30 is also associated with the safety shield collar 26. As the plunger 14 is released during firing of the device 100, the plunger rail component(s) 15 slide within the notches 27 of the safety shield collar 26 until the plunger 14 reaches a position wherein a plunger gap 15 interfaces with the notches 27, wherein the safety shield torsion spring 28 causes the safety collar 26 to rotate such that the safety shield locking tab 30 locks the safety shield 12 in an extended position. FIG. 13 shows the safety shield 12 in an extended, locked position, and the safety shield locking tab 30 interfacing therewith.

Figure 14:
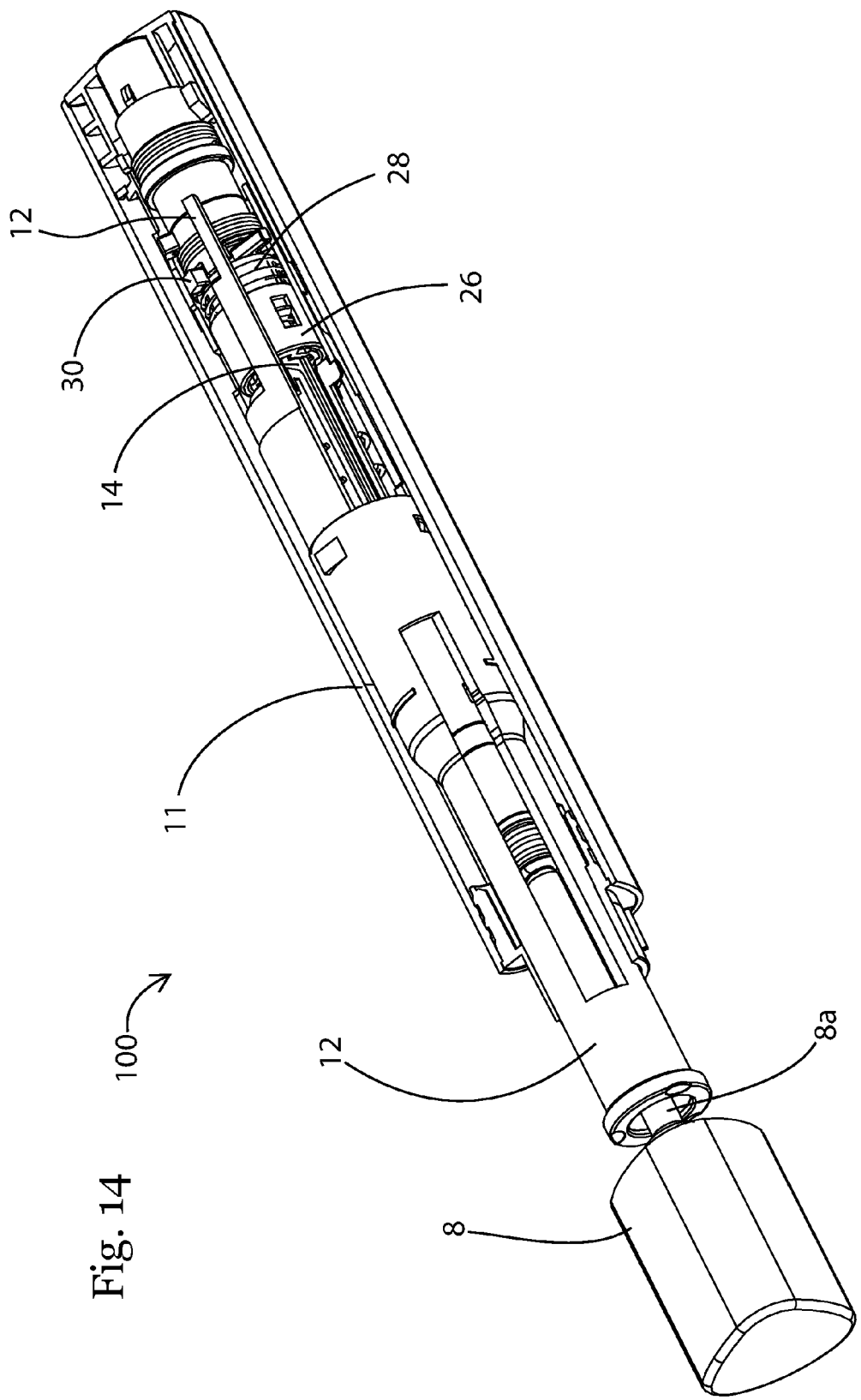
FIG. 14 is a perspective, partial cutaway view of an embodiment of the device and a reset cap being inserted into the distal end thereof to reset the device.

When the safety shield 12 has reached its extended, locked position as shown in FIGS. 13-14, it may be reset with a reset cap 8 shown in FIG. 14. The reset cap 8 may include, in a non-limiting embodiment, a rest cap shaft 8a, such that upon insertion of the reset cap 8 into or association of the reset cap 8 with the distal end of the safety shield 12, and movement of the reset cap 8 toward the proximal end of the outer shell 11, the safety shield 12 can be reset from a fired, extended, locked position to a reset position (i.e., unlocked position). The shaft 8a of the reset cap 8 may interface with the distal end of the plunger 14b during reset of the plunger 14, and ultimately reset of the device 100. Consequently, a first step in resetting the device 100 includes association of the reset cap 8 with the distal end of the device 100 as shown in FIG. 14.

Figure 15:
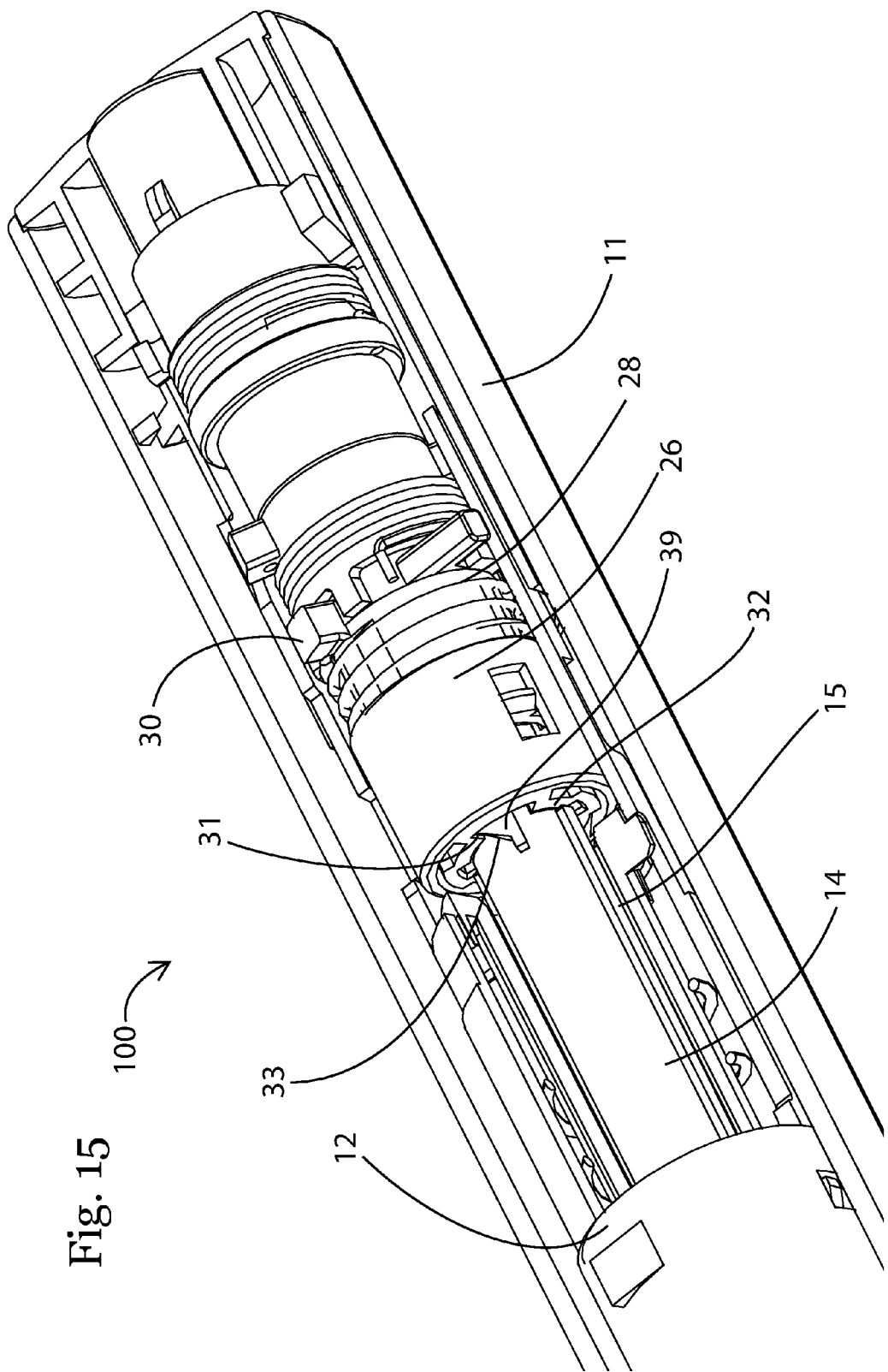
FIG. 15 is a partial cutaway view of components of an embodiment of the device during reset.
Figure 16:
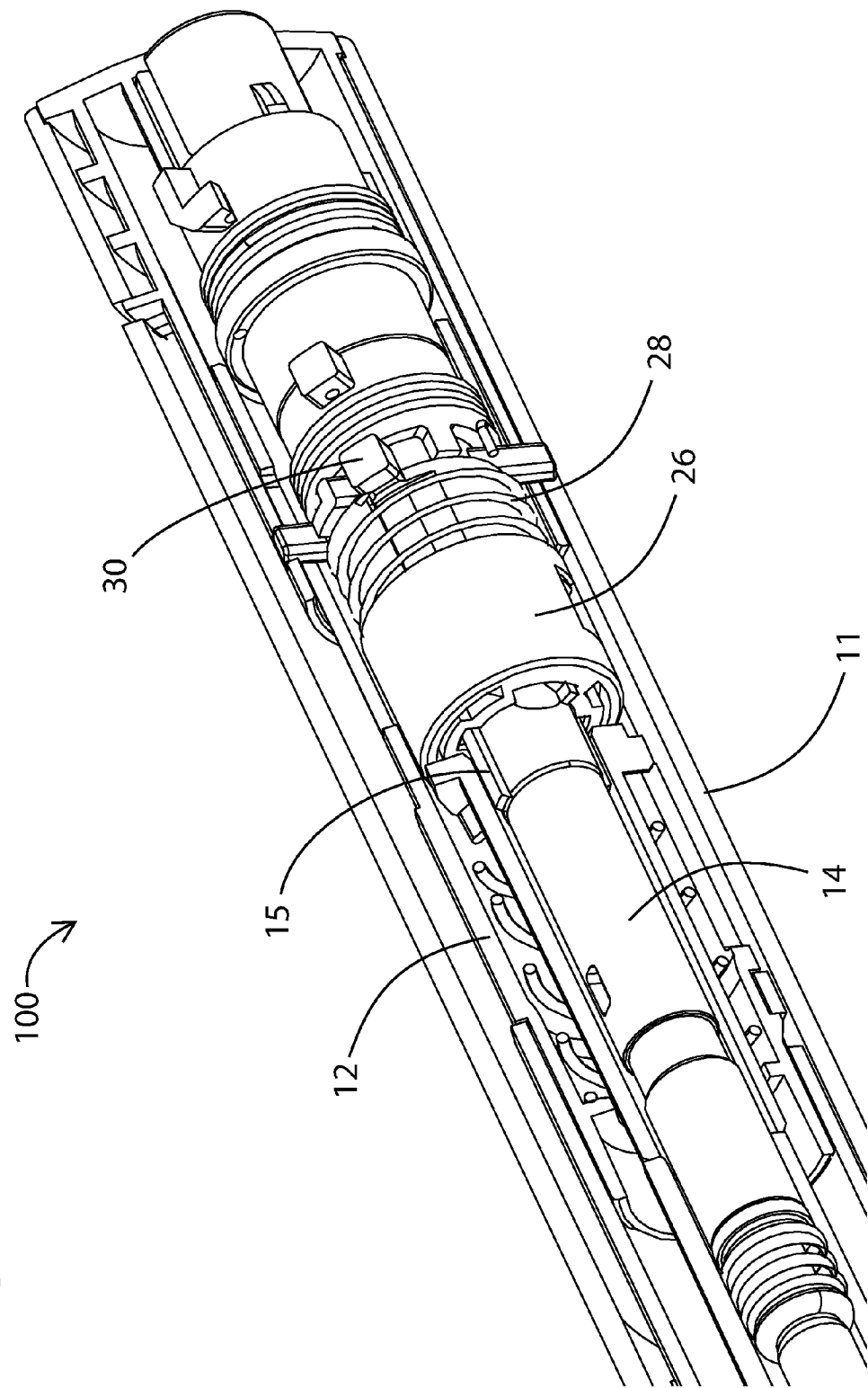
FIG. 16 is a partial cutaway view of components of an embodiment of the device during reset.

Further movement of the reset cap toward the proximal end of the outer shell 11 such that the reset cap 8 causes the plunger 14 to slide toward the proximal end of the outer shell 11 to begin resetting the device. During reset, the plunger rail component(s) 15 presses against a safety shield tab 32 on an inner surface of the rotatable safety shield collar 26 to move the safety shield collar toward the proximal end of the device 100 as shown in FIG. 100. The safety shield tab 32 includes a safety shield angled surface 31 which interfaces with a complementary angled surface 33 of a reset component 39 within the chamber of the outer shell 11 as shown in FIG. 15 As shown, the reset component is a separate structural feature that interfaces within the rotatable safety shield. However, other examples of a reset component could be implemented. For example, the reset component could be a protruding structure of the internal surface of the outer shell that interacts with the safety shield collar. Movement of these angled surfaces 31, 33, relative to one another as the plunger rail component 15 interfaces with the safety shield tab 32, moving the rotatable safety shield collar 26 toward the proximal end of the outer shell 11 causes the safety shield collar 26 to rotate against the biasing force, in one non-limiting example, of the safety shield torsion spring 28 to reset the safety shield collar 26, such that the safety shield locking tab 30 is removed from contact with the safety shield 12. This allows reset of the safety shield 12, and release of the safety shield from a locked to an unlocked position for a subsequent use of the device 100. Rotation of the rotatable safety shield collar 26 in this manner allows the notch(es) 27 to align with the plunger rail component(s) 15. The plunger rail component(s) 15 may be slidable within the notch(es) 27 to allow further reset of the plunger 14 to a pre-fired position (i.e., further movement of the plunger 14 toward the proximal end of the device 100) as shown in FIG. 16.

FIG. 17 is a cross-sectional view of a distal end of the components of an embodiment of the device 100 showing the final step in reset of the device 100. A plunger collar angled ramp portion 25 on the plunger collar tab 23 of plunger collar 20 interacts with a plunger angled ramp portion 18 on the plunger 14 once the plunger 14 reaches the proximal end of the device 100. Movement of the plunger 14 during reset such that the plunger angled ramp portion 18 interacts with the plunger collar angled ramp portion 25 causes the plunger collar 20 to rotate in a counter-clockwise direction against the force of the plunger collar torsion spring 22 (counter clockwise if viewed from the proximal end of the device 100), in one non-limiting embodiment. This rotation allows the plunger feature 16 to traverse the plunger collar 20. Once the plunger feature 16 has traversed the plunger collar tab 23, has been fully reset, and has entered a pre-fired position, the plunger collar 20 rotates in a clockwise (viewed from proximal end of the device) direction due to the bias of the plunger collar torsion spring 22, to lock the plunger in the reset, pre-fired position. Upon full reset of the plunger 14, the device 100 is fully reset and may be actuated again for a subsequent use by applying pressure to the distal end of the shield 12.

Certain embodiments herein have been described to include an outer housing and an inner housing; however, in alternative embodiments, the device is not limited to having two housings, the device may include only one housing, and features of both housings may be provided on the sole housing of the device. In further embodiments of the device, there may be more than two housings, for example.

While one or more embodiments of the present invention have been shown and described herein, such embodiments are provided by way of example only. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A resettable injection training device, comprising:
   an outer shell comprising a proximal end and a distal end, the outer shell defining a chamber there within;
   a plunger slidable within the chamber, the plunger comprising a plunger feature and one or more rail portions;
   a locking safety shield disposed and slidable within the chamber, the safety shield comprising a proximal end and a distal end, the distal end for interfacing with a target surface to actuate the injection training device, said safety shield comprising an extended locked position, an extended unlocked position, and a retracted position;
   a rotatable plunger collar comprising a plunger collar tab for interfacing with the plunger feature and with the safety shield, wherein said plunger collar is rotated in a first direction to release the plunger from a pre-fired position to a fired position;
   a rotatable safety shield collar comprising a locking tab, the locking tab for interfacing with the safety shield to lock the safety shield in an extended, locked position in the fired position;
   a reset component disposed within the chamber, said reset component configured to interface with the safety shield collar to unlock the safety shield during reset of the device.

2. The resettable injection training device of claim 1 further comprising a reset cap for interacting with the plunger to reset the resettable injection training device.

3. The resettable injection training device of claim 2, wherein the reset cap comprises a shaft portion for interfacing with the plunger during reset.

4. The resettable injection training device of claim 2, wherein association of the reset cap with the distal end of the safety shield and with the plunger, and movement of the reset cap toward the proximal end of the safety shield resets the device.

5. The resettable injection training device of claim 4, wherein the rotatable safety shield collar comprises one or more tabs and one or more notches disposed between the one or more tabs on its inner surface, such that movement of the plunger toward the proximal end of the outer housing causes the one or more rail portions to interact with the one or more tabs and slide the safety shield collar toward the proximal end of the outer shell.

6. The resettable injection training device of claim 5, wherein the rotatable safety shield collar comprises a safety shield angled surface on its inner surface, and wherein the reset component comprises a complimentary angled surface, such that movement of the safety shield collar toward the proximal end of the outer shell causes the safety shield angled surface to interface with the reset component angled surface to rotate the safety shield collar to release the locking tab from the safety shield and unlock the safety shield.

7. The resettable injection training device of claim 6, wherein rotation of the safety shield collar causes each rail portion of the plunger to align with a corresponding notch on the safety shield collar, such that the plunger can be further moved toward the proximal end of the outer shell to reset the device.

8. The resettable injection training device of claim 7, wherein the plunger comprises a proximal end and a distal end, and the plunger feature comprises at least one plunger angled ramp portion at the proximal end.

9. The resettable injection training device of claim 8, wherein the plunger collar tab comprising a plunger collar angled ramp portion for interfacing with the plunger angled ramp portion, when the plunger is moved toward the proximal end of the outer shell to reset the device.

10. The resettable injection training device of claim 9, wherein a plunger collar torsion spring is associated with the plunger collar, such that the plunger collar is biased in a first direction, and movement of the plunger toward the proximal end of the outer shell causes the plunger collar to interface with the plunger angled ramp portion to rotate the plunger collar in a second direction, until the plunger feature traverses the plunger collar and the plunger is reset to a pre-fired position.

11. The resettable injection training device of claim 10, wherein when the plunger collar torsion spring biases the plunger collar in the first direction, the plunger collar tab interfaces with the plunger feature to lock the plunger in the pre-fired position.

12. The resettable injection training device of claim 1, wherein the safety shield can be moved from the unlocked extended position to the retracted position to fire the device.

13. The resettable injection training device of claim 12, wherein the safety shield comprises a safety shield interfacing surface at its proximal end and the rotatable plunger collar comprises a plunger collar interfacing surface on an outer surface thereof, such that exertion of a force on the distal end of the safety shield to move it from the unlocked extended position to the retracted position causes the safety shield interfacing surface to interface with the plunger collar interfacing surface to rotate the plunger collar in a second direction.

14. The resettable injection training device of claim 13, wherein rotation of the plunger collar in the second direction releases the plunger collar tab from the plunger feature, such that the plunger extends from a pre-fired position to a fired position.

* * * * *